United States Patent
Hwang et al.

(10) Patent No.: US 8,843,071 B2
(45) Date of Patent: Sep. 23, 2014

(54) METHOD AND APPARATUS FOR CONTROLLING INTERFERENCE IN NEAR FIELD COMMUNICATION NETWORK INCLUDING A PLURALITY OF CONNECTIONS FOR DIRECT COMMUNICATION BETWEEN TERMINALS

(75) Inventors: Pil-Yong Hwang, Gimpo-si (KR); Yung-Soo Kim, Seongnam-si (KR); Jong-Hyung Kwun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

(21) Appl. No.: 13/605,639

(22) Filed: Sep. 6, 2012

(65) Prior Publication Data

US 2013/0065522 A1 Mar. 14, 2013

(30) Foreign Application Priority Data

Sep. 8, 2011 (KR) .................. 10-2011-0091514

(51) Int. Cl.
| | |
|---|---|
| *H04B 1/00* | (2006.01) |
| *H04B 15/00* | (2006.01) |
| *H04W 76/02* | (2009.01) |
| *H04W 76/00* | (2009.01) |
| *H04W 72/08* | (2009.01) |
| *H04B 5/00* | (2006.01) |
| *H04B 17/00* | (2006.01) |

(52) U.S. Cl.
CPC ............... *H04B 5/00* (2013.01); *H04W 76/023* (2013.01); *H04W 76/00* (2013.01); *H04B 15/00* (2013.01); *H04W 72/082* (2013.01); *H04B 17/00* (2013.01)
USPC .................... 455/63.1; 455/67.11; 455/67.13; 455/68; 455/69; 455/41.1; 455/41.2; 455/450; 455/452.1; 455/452.2; 370/329; 370/331; 370/332

(58) Field of Classification Search
USPC ........... 455/41.1, 41.2, 500, 501, 63.1, 67.11, 455/67.13, 68, 69, 507, 509, 512–515, 450, 455/452.1, 452.2; 370/329, 331, 332
See application file for complete search history.

(56) References Cited

U.S. PATENT DOCUMENTS

| | | | | |
|---|---|---|---|---|
| 7,167,709 | B2* | 1/2007 | Schwarz et al. | 455/436 |
| 7,652,995 | B2* | 1/2010 | Cromer et al. | 370/235 |
| 8,335,181 | B2* | 12/2012 | Jung et al. | 370/328 |
| 8,412,103 | B2* | 4/2013 | Srinivasan et al. | 455/63.1 |

(Continued)

FOREIGN PATENT DOCUMENTS

| | | |
|---|---|---|
| JP | 2012-508506 A | 4/2012 |
| TW | 200922349 A | 5/2009 |

*Primary Examiner* — Tuan A Tran
(74) *Attorney, Agent, or Firm* — Jefferson IP Law, LLP

(57) ABSTRACT

A method for controlling interference in a Near Field Communication (NFC) network including a plurality of connections for direct communication between terminals is provided. The method includes receiving a signal transmitted by a first terminal through a first connection for direct communication with the first terminal, and measuring received power for the signal, measuring received power for each of interference signals upon receiving the interference signals caused by communication through connections other than the first connection among the plurality of connections, calculating a first Signal-to-Interference Ratio (SIR) using the received power for the signal and the received power for each of interference signals, and determining to one of maintain and release setup for each of the connections other than the first connection, if the first SIR is less than a threshold.

19 Claims, 13 Drawing Sheets

(56) References Cited

U.S. PATENT DOCUMENTS

| | | | |
|---|---|---|---|
| 8,514,709 B2* | 8/2013 | Cromer et al. | 370/235 |
| 8,565,785 B2* | 10/2013 | Lee et al. | 455/456.1 |
| 2009/0023086 A1 | 1/2009 | Kim | |
| 2010/0087221 A1 | 4/2010 | Srinivasan et al. | |
| 2010/0118733 A1 | 5/2010 | Wu et al. | |
| 2010/0128689 A1* | 5/2010 | Yoon et al. | 370/329 |
| 2010/0272086 A1* | 10/2010 | Jung et al. | 370/338 |
| 2011/0086651 A1* | 4/2011 | Li et al. | 455/501 |
| 2011/0195724 A1 | 8/2011 | Lee et al. | |
| 2011/0228691 A1 | 9/2011 | Wu et al. | |
| 2012/0149362 A1* | 6/2012 | Tooher et al. | 455/423 |

* cited by examiner

<200>
$$SIR_g = \frac{h_{ga}p_a}{h_{gb}p_b + h_{gc}p_c + h_{ge}p_e + h_{gf}p_f} < T$$

<205>
$$SIR_g = \frac{h_{ga}p_a}{h_{gb}p_b + h_{\cancel{gc}}p_c + h_{ge}p_e + h_{gf}p_f} < T$$

<210>
$$SIR_g = \frac{h_{ga}p_a}{h_{gb}p_b + h_{\cancel{gc}}p_c + h_{ge}p_e + h_{\cancel{gf}}p_f} > T$$

METHOD AND APPARATUS FOR CONTROLLING INTERFERENCE IN NEAR FIELD COMMUNICATION NETWORK INCLUDING A PLURALITY OF CONNECTIONS FOR DIRECT COMMUNICATION BETWEEN TERMINALS

PRIORITY

This application claims the benefit under 35 U.S.C. §119 (a) of a Korean patent application filed on Sep. 8, 2011 in the Korean Intellectual Property Office and assigned Serial No. 10-2011-0091514, the entire disclosure of which is hereby incorporated by reference.

BACKGROUND OF THE INVENTION

1. Field of the Invention

The present invention relates to a method and apparatus for a near field communication network. More particularly, the present invention relates to a method and apparatus for controlling interference in near field communication network including a plurality of connections for direct communication between terminals.

2. Description of the Related Art

Near Field Communication (NFC) is a technology for very-short distance wireless communication. NFC may include Device-to-Device (D2D) or Ad-hoc communication that does not require repeaters.

In a case where a plurality of connections exist in an NFC network, for each of a plurality of terminals that may simultaneously attempt direct communication with another terminal, the connections may be affected by interference due to the communication via the connections (hereinafter referred to as 'adjacent connections') which are set up for direct communication between nearby terminals.

For example, if an arbitrary connection uses the same frequency band as its adjacent connections, the arbitrary connection may not be granted communication unless it is determined that a collision will not occur between the arbitrary connection and the adjacent connections.

Therefore, a need exists for a scheme for granting communication for an arbitrary connection by taking into account interference between the arbitrary connection and its adjacent connections, in a case where a plurality of connections exist in an NFC network, for each of a plurality of terminals that may simultaneously attempt direct communication with another terminal.

SUMMARY OF THE INVENTION

Aspects of the present invention are to address at least the above-mentioned problems and/or disadvantages and to provide at least the advantages described below. Accordingly, an aspect of the present invention is to provide a method and apparatus for controlling interference by releasing setup for an adjacent connection having low priority or higher received power among the adjacent connections to an arbitrary connection, in a case where a plurality of connections exist in an Near Field Communication (NFC) network, for each of a plurality of terminals that may simultaneously attempt direct communication with another terminal.

In accordance with an aspect of the present invention, a method for controlling interference in a NFC network is provided. The method includes a plurality of connections for direct communication between terminals. The method includes receiving a signal transmitted by a first terminal through a first connection for direct communication with the first terminal, and measuring received power for the signal, measuring received power for each of interference signals upon receiving the interference signals caused by communication through connections other than the first connection among the plurality of connections, calculating a first Signal-to-Interference Ratio (SIR) using the received power for the signal and the received power for each of interference signals, and determining to one of maintain and release setup for each of the connections other than the first connection, if the first SIR is less than a threshold.

In accordance with another aspect of the present invention, a method for controlling interference in a NFC network having a plurality of connections for direct communication between terminals is provided. The method includes transmitting a signal through a first connection for direct communication with a first terminal, and waiting for a response signal to the transmitted signal, upon receiving the response signal, determining whether the response signal includes a setup release indication for the first connection, and recognizing that signal exchange with the first terminal is possible, if the response signal includes no setup release indication for the first connection.

In accordance with yet another aspect of the present invention, an apparatus for controlling interference in a NFC network including a plurality of connections for direct communication between terminals is provided. The apparatus includes a receiver receiving a signal transmitted by a first terminal through a first connection for direct communication with the first terminal, and receiving interference signals caused by communication through connections other than the first connection among the plurality of connections, a received power measurer measuring received power for the signal transmitted by the first terminal and each of the interference signals, a SIR calculator calculating a first SIR using the received power for the signal and the received power for each of the interference signals, a comparator comparing the first SIR with a threshold, and a connection maintain/release determiner determining to one of maintain and release setup for each of connections other than the first connection, if the first SIR is less than the threshold.

In accordance with still another aspect of the present invention, an apparatus for controlling interference in a NFC network having a plurality of connections for direct communication between terminals is provided. The apparatus includes a transmitter transmitting a signal through a first connection for direct communication with a first terminal, a receiver receiving a response signal to the transmitted signal, a response signal checker, upon receiving the response signal, determining whether the response signal includes a setup release indication for the first connection, and a connection state recognizer recognizing that signal exchange with the first terminal is possible, if the response signal includes no setup release indication for the first connection.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In a case where a plurality of connections exist in a Near Field Communication (NFC) network, for each of a plurality of terminals, that may simultaneously attempt direct communication with another terminal, a connection may be affected by interference from adjacent connections. Therefore, schemes for granting communication of a terminal by taking into account interference from adjacent terminals have been studied.

One of the schemes includes flashlinQ, in which each of the terminals (hereinafter referred to as 'receiving terminals') serving as a receiving side in direct communication between terminals, measures received powers (Rx powers) for signals received through a connection set up in advance between the terminals (hereinafter referred to as 'transmitting terminals') serving as a transmitting side in the direct communication and through adjacent connections. A reciprocal of the measured received power is transmitted to the transmitting terminals. Upon receiving the reciprocal, each of the transmitting terminals releases an adjacent connection having the highest received power.

Figure 1:
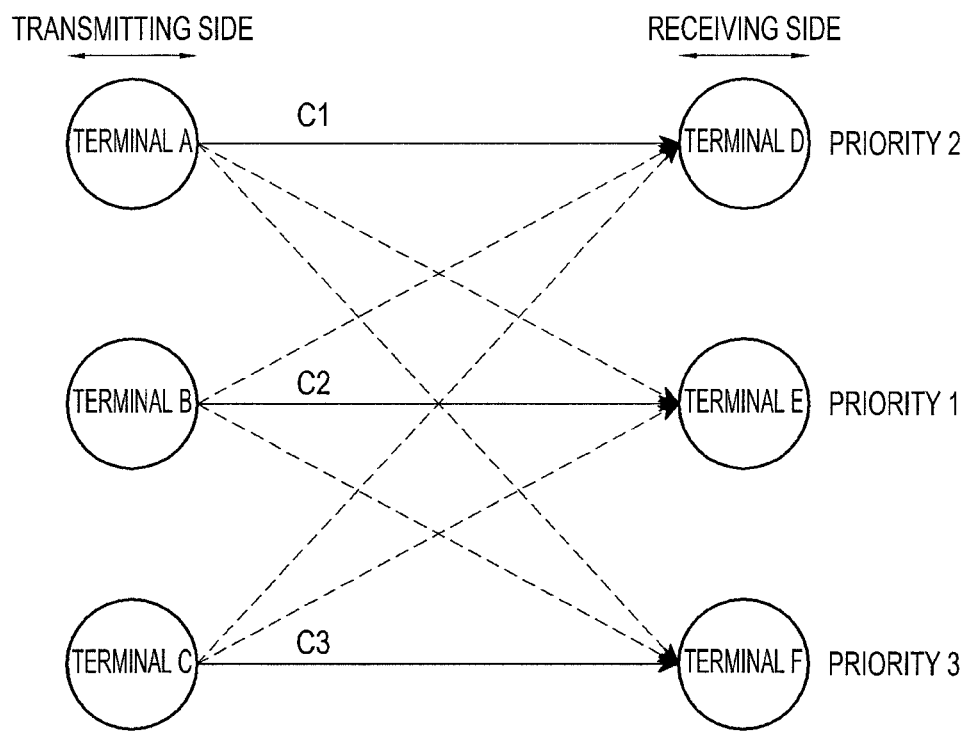
FIG. 1 is a diagram provided for a description of flashlinQ according to an exemplary embodiment of the present invention.

FIG. 1 is a diagram provided for a description of general flashlinQ.

Referring to FIG. 1, for three transmitting terminals A, B and C and three receiving terminals D, E and F, between which direct communication is performed, predetermined connections are simultaneously set up there between. The connections have their own predetermined priorities.

Specifically, a connection between the terminal A and the terminal D has a priority of 2 and its connection identifier is C1. A connection between the terminal B and the terminal E has a priority of 1 and its connection identifier is C2. A connection between the terminal C and the terminal F has a priority of 3 and its connection identifier is C3.

For example, the terminal D may receive interference signals caused by communication of the terminals B and C to which adjacent connections are set up, excluding the terminal A to which its connection is set up. Then, the terminal D measures received power for a signal received from the terminal A, and measures received power for a signal received from the terminal C having higher received power among the terminals B and C. In this case, if received powers for signals acting as interference are less than a predetermined threshold of received power, the signals may be considered ignorable signals. The terminal D calculates a Signal-to-Interference Ratio (SIR) using the received power of the terminal B and the received power of the terminal C. Thereafter, the terminal D compares the calculated SIR with a threshold, and determines whether to maintain the setup of C1 depending on the comparison results. In other words, if the SIR of the terminal B and the terminal C is less than the threshold, the terminal D maintains the setup of its connection C1, and transmits/receives signals through the connection C1. On the other hand, if the SIR of the terminal B and the terminal C is greater than or equal to the threshold, the terminal D releases the setup of its connection C1.

As another example, the terminal E also receives interference signals caused by communication of the terminals A and C to which adjacent connections are set up, excluding the terminal B to which its connection is set up. Even though the terminal E receives, from the terminal A, signals whose received power is greater than or equal to the threshold of received power, the terminal E maintains the setup of C2 because its connection C2 has the highest priority compared with its adjacent connections. The terminal E measures received power only for the signals received from the terminal B, and then transmits a reciprocal of the measured received power only to the terminal A and the terminal B. The terminal E transmits interference-related information together with the reciprocal of the received power. The terminal A and the terminal B may then recognize that the setup of C2 is maintained. The terminal A releases the setup of the connection C1, recognizing that it (or its connection C1) acts as interference to the connection C2.

The terminal E does not transmit a reciprocal of received powers for the signals transmitted by the transmitting terminals, to the terminals (i.e., the terminals A and C) that transmitted signals acting as interference signals. As a result, the terminal A and the terminal C may not recognize the impact of their interferences to the terminal E.

The interference control procedure of flashlinQ is somewhat complicated, since both transmitting terminals and receiving terminals, between which direct communication is performed, should perform interference control operations. When determining whether to maintain a connection, the terminals use only the interference for the connection having received power with the highest value among the adjacent connections, instead of considering interferences of all connections, thereby resulting in a decrease in accuracy of interference control.

Therefore, an exemplary embodiment of the present invention provides a simplified interference control method in which only the receiving terminals, for which connections are set up for direct communication in an NFC network, determine whether to maintain setup of adjacent connections to their own connections. When determining whether to maintain setup of adjacent connections to their own connections, the receiving terminals consider interferences for all of their adjacent connections, contributing to an increase in accuracy of interference control.

Specifically, in an exemplary embodiment of the present invention, if a plurality of connections for direct communication between terminals simultaneously exist in an NFC network, each receiving terminal, for which a connection is set up, measures received power for a signal received through its connection and interference signals received due to communication of adjacent connections. The receiving terminal calculates its SIR using the measured received powers. Thereafter, the receiving terminal compares its SIR with a threshold of SIR. If its SIR is less than the threshold of SIR, the receiving terminal checks whether a connection having a lower priority than its connection exists among the adjacent connections. If there is a connection having a lower priority, the receiving terminal releases setup for the adjacent connections in an order of priority from lowest to highest priority, or in an order of received power from highest to lowest received power. Only one of the priority and the received power strength may be considered, which are considered in determining whether to release setup for the adjacent connections, or a sum (i.e., sum=a*priority+b*power strength, where 'a' and 'b' are proportional coefficients) of the priority and the received power strength may be considered, in which both are considered.

A scheme for controlling interference between connections set up for direct communication between terminals in NFC according to an exemplary embodiment of the present invention will be described below with reference to FIGS. 2A and 2B.

Figures 2A, 2B:
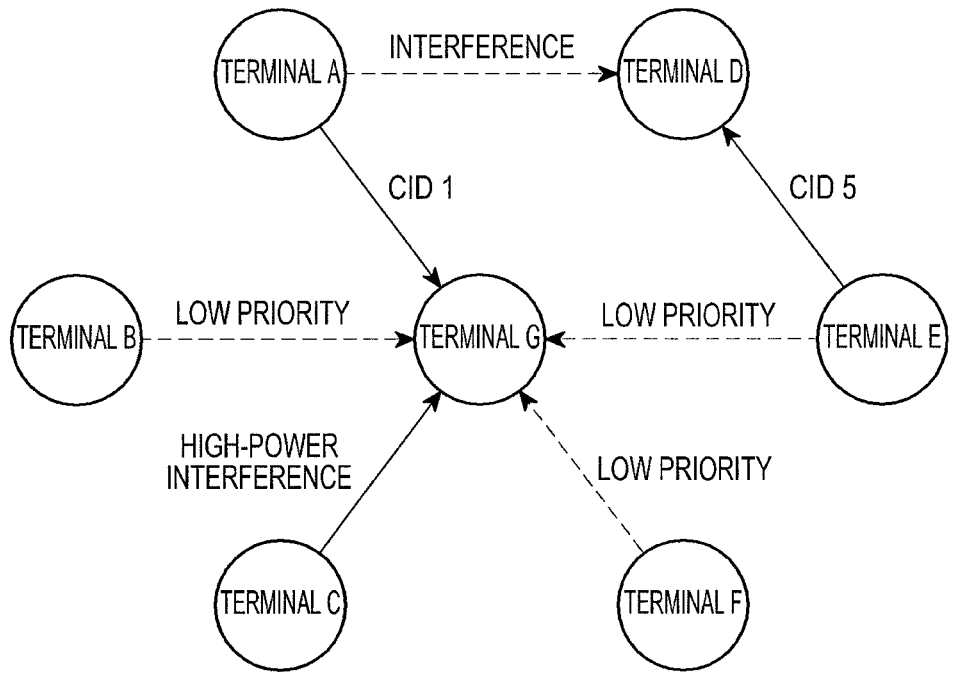
FIG. 2A shows an example of connections set up in a Near Field Communication (NFC) network according to an exemplary embodiment of the present invention.
FIG. 2B shows an example of a receiving side's operation of managing setup of connections set up in an NFC network according to an exemplary embodiment of the present invention.

FIGS. 2A and 2B show an example of connections set up for direct communication between terminals in an NFC network according to an exemplary embodiment of the present invention.

Referring to FIG. 2A, a plurality of terminals A, B, C, D, E, F and G exist in the NFC network, for each of which a connection for direct communication with other terminals is set up.

For example, for the terminal G, its connection with a Connection Identifier (CID) 1 is set up with the terminal A, and for the terminal E, its connection with a CID5 is set up with the terminal D. For instance, a method in which the terminal G controls interference for its connection will be described. The terminal G receives interference signals caused by communication in adjacent connections. It will be assumed herein that the adjacent connections include connections of the terminal B, the terminal C, the terminal E and the terminal F. In this case, the terminal B recognizes that an interference signal having higher received power is received due to communication in the connection of the terminal C among the adjacent connections. The terminal G recognizes that an interference signal having lower received power is received due to communication in the connections of the terminal E and the terminal F. It will be assumed that whether received power for an interference signal is high or low is determined using a predetermined threshold of received power.

FIG. 2B shows an example of a receiving side's operation of managing setup of connections set up in an NFC network according to an exemplary embodiment of the present invention.

Referring to FIG. 2B, the terminal G measures received power of a signal received through its connection CID1 and received powers of interference signals received due to communication in the adjacent connections. The terminal G calculates an SIR in accordance with Equation (1) below, using the received powers.

$$SIR_g = \frac{h_{ga} p_a}{h_{gb} p_b + h_{gc} p_c + h_{ge} p_e + h_{gf} p_f} \quad (1)$$

where $SIR_g$ represents an SIR of the terminal G; $P_a$ represents received power that the terminal G has measured for a signal received from the terminal A through the connection CID1; $P_c$, $P_e$ and $P_f$ represent received powers that the terminal G has measured for interference signals received due to communication in the connections of the terminal C, the terminal E and the terminal F, respectively; and $h_{ga}$, $h_{gb}$, $h_{gc}$, $h_{ge}$ and $h_{gf}$ represent channel measurements between the terminal G and the terminals A, B, C, E and F, respectively. The channel measurements may be determined by taking only the path loss into account.

Thereafter, the terminal G compares its SIR with a predetermined threshold T of the SIR in operation 200. Assuming that the terminal G's SIR is less than the threshold T of the SIR, the connection of the terminal G has the highest priority, and only received powers of interference signals received due to communication in the adjacent connections are considered in the following description.

The terminal G calculates a new SIR, excluding received power for the connection (i.e., a connection of the terminal C) that transmitted an interference signal having received power with the highest value among the adjacent connections, in accordance with Equation (2) below. 'X' in Equations (2) and (3) below is a symbol indicating the excluded received power.

The terminal G releases the connection of the terminal C, and transmits to the terminal C information indicating the release of the setup for the connection of the terminal C. This information will be described in detail below.

$$SIR_g = \frac{h_{ga} p_a}{h_{gb} p_b + \cancel{\phantom{x}} + h_{ge} p_e + h_{gf} p_f} < T \qquad (2)$$

After releasing the setup for the connection of the terminal C, the terminal G calculates again an SIR using received powers of interference signals received only from the remaining adjacent connections excluding the connection of the terminal C. The terminal G compares the re-calculated SIR with the threshold T of the SIR. If the re-calculated SIR is still less than the threshold T of the SIR in operation 205, the terminal G checks the connection that transmitted an interference signal having the second highest received power among the adjacent connections excluding the adjacent connection of the terminal C. For example, if the connection that transmitted an interference signal having the second highest received power is assumed to be a connection of the terminal F, the terminal G calculates a new SIR in accordance with Equation (3), using received powers of interference signals received only from the adjacent connections excluding the connections of the terminal C and the terminal F.

$$SIR_g = \frac{h_{ga} p_a}{h_{gb} p_b + \cancel{\phantom{x}} + h_{ge} p_e + \cancel{\phantom{x}}} > T \qquad (3)$$

Thereafter, the terminal G compares again the new SIR with the threshold T of SIR in operation 210. The terminal G releases setup for its adjacent connections in an order of received power from highest to lowest received power until the calculated SIR exceeds the threshold T of the SIR, thereby controlling interference to its own connection.

Figures 3A, 3B:
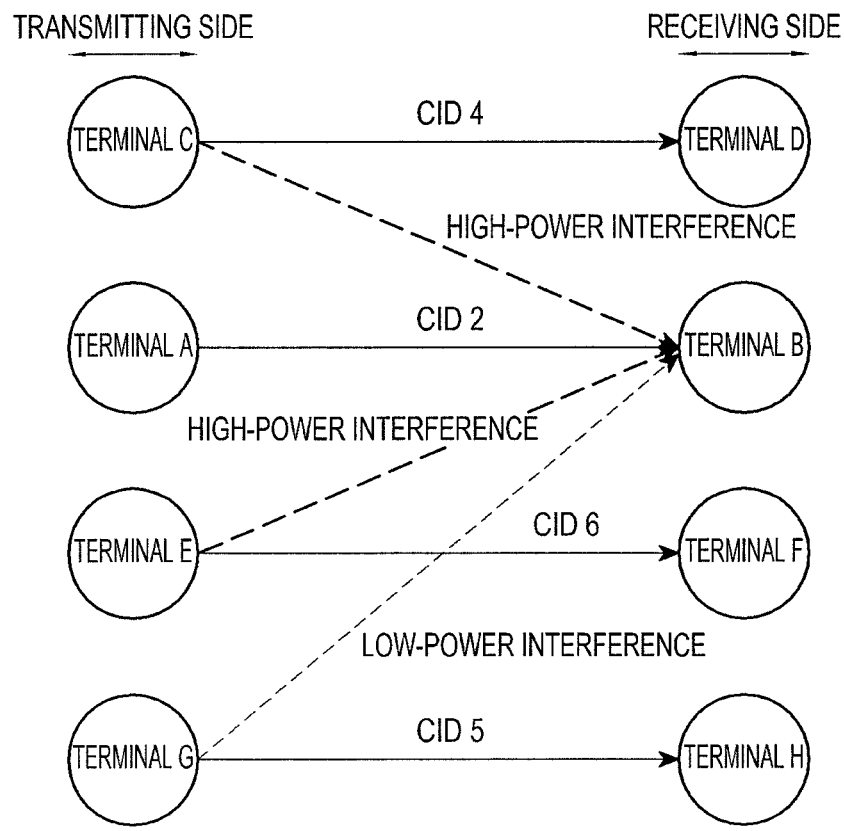
FIG. 3A shows an Orthogonal Frequency Division Multiplexing (OFDM) resource block according to an exemplary embodiment of the present invention.
FIG. 3B shows another example of connections set up in an NFC network for direct communication between terminals according to a first exemplary embodiment of the present invention.

FIG. 3A shows an Orthogonal Frequency Division Multiplexing (OFDM) resource block according to an exemplary embodiment of the present invention. FIG. 3B shows another example of connections set up in an NFC network for direct communication between terminals according to a first exemplary embodiment of the present invention.

Referring to FIG. 3B, for four transmitting terminals C, A, E and G, and four receiving terminals D, B, F and H, connections for direct communication are set up in advance. The connections have their own predetermined priorities. Specifically, a connection between the terminal C and the terminal D has a connection identifier of CID4. A connection between the terminal A and the terminal B has a CID2. A connection between the terminal E and the terminal F has a CID6. A CID between the terminal G and the terminal H is a CID5.

Referring to FIG. 3A, an OFDM resource block includes sub-blocks in which energy tones are mapped to symbols. Sub-blocks in which higher energy tones are mapped to arranged symbols may be assigned CIDs having higher priorities. Therefore, in the first symbol, a CID2, to which the highest energy tone is allocated, has the highest priority. Thus, the connection between the terminal A and the terminal B has the highest priority.

Knowing that its connection CID2 to the terminal A has the highest priority, the terminal B may recognize that interference signals having higher received power are received due to communication in its adjacent connections CID4 and CID6 of the terminal C and the terminal E. In addition, the terminal B may recognize that interference signals having lower received power are received due to communication in its adjacent connection CID5 of the terminal G.

Figure 3C:
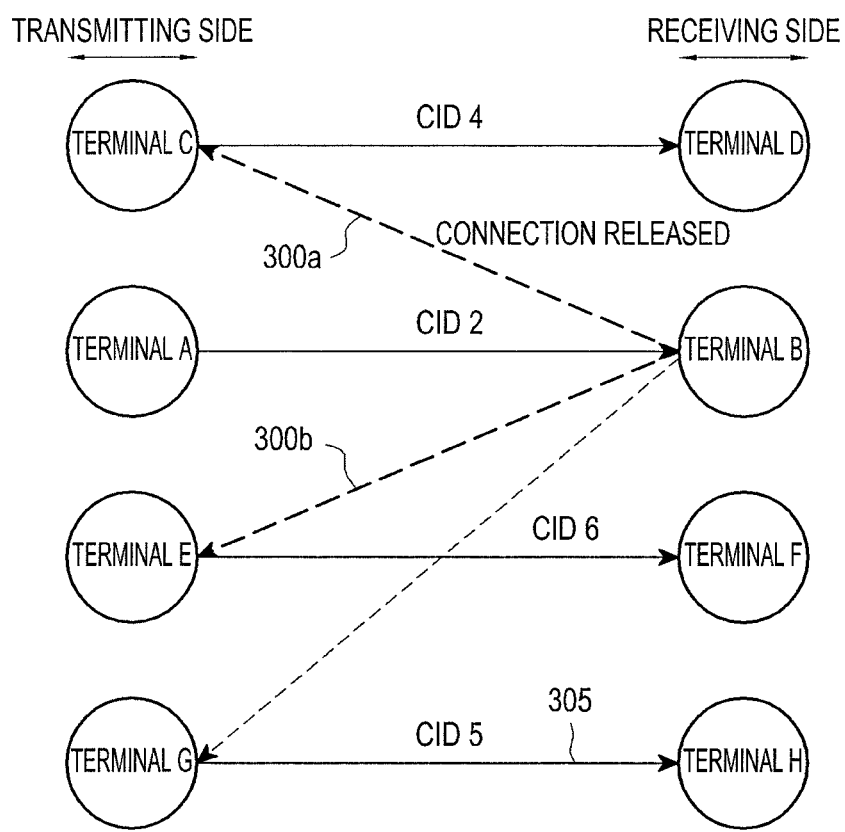
FIG. 3C shows an example of controlling interference between connections set up in an NFC network according to the first exemplary embodiment of the present invention.

FIG. 3C shows an example of controlling interference between connections set up in an NFC network according to the first exemplary embodiment of the present invention.

Referring to FIG. 3C, the terminal B compares received powers for interference signals received due to communication in the remaining connections excluding its connection CID2, with a threshold of received power.

Specifically, the terminal B measures received powers for interference signals, which are received due to communication in the connections CID4, CID6 and CID5 of the terminals C, E and G. The terminal B compares the measured received powers with the threshold of received power. From the comparison, the terminal B determines that received powers of the interference signals received due to communication in the connections CID4 and CID6 of the terminal C and the terminal E, exceed the threshold of received power. Thus, the terminal B releases setup of the connections (i.e., connections CID4 and CID6) whose received powers exceed the threshold of received power (see 300a and 300b), upon determining that the connections CID4 and CID6 have high interference power.

The terminal B determines that received power of the interference signals received due to communication in the connection CID5 of the terminal G is less than or equal to the threshold of received power. Then, the terminal B maintains setup of the connection CID5 whose received power is less than or equal to the threshold of received power (see 305), upon determining that interference power of the connection CID5 is low enough to be ignored.

Figure 4A:
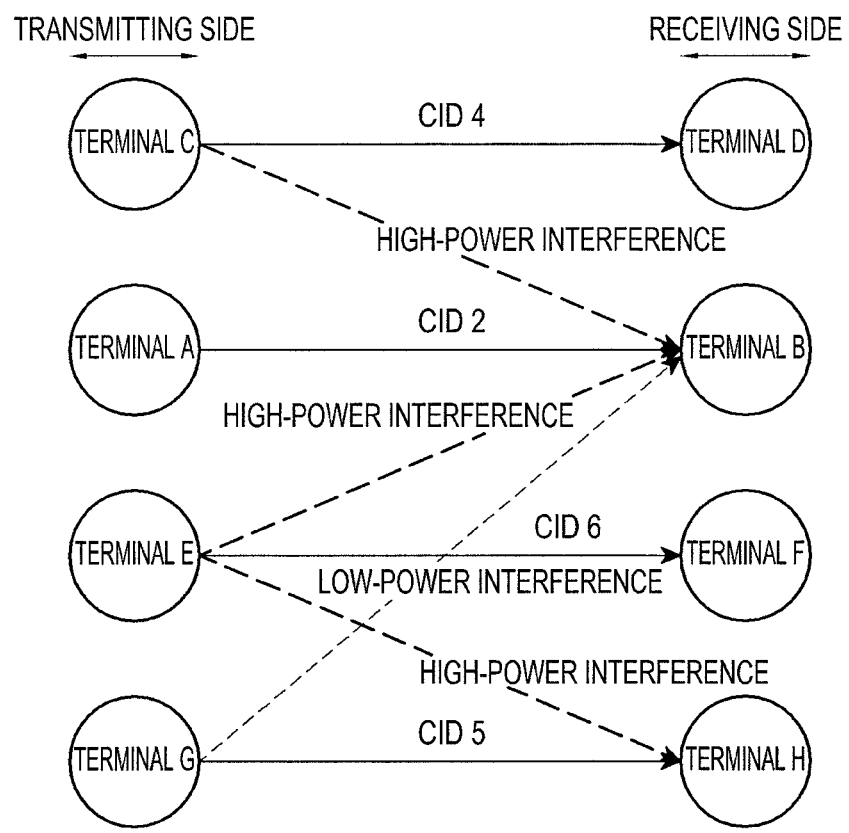
FIG. 4A shows another example of connections set up in an NFC network according to a second exemplary embodiment of the present invention.

FIG. 4A shows another example of connections set up in an NFC network according to a second exemplary embodiment of the present invention, in which transmitting terminals and receiving terminals are assumed to have the same configurations and connections as those in FIGS. 3B and 3C. Their connections are also assumed to have the same priorities as those in FIGS. 3B and 3C.

Referring to FIG. 4A, the terminal B controls interference in the way shown in FIG. 4A since it has the highest priority. The terminal H recognizes that interference signals having higher received power are received due to communication in the connection CID6 of the terminal E which is a transmitting terminal other than the terminal G to which its connection is set up.

Figure 4B:
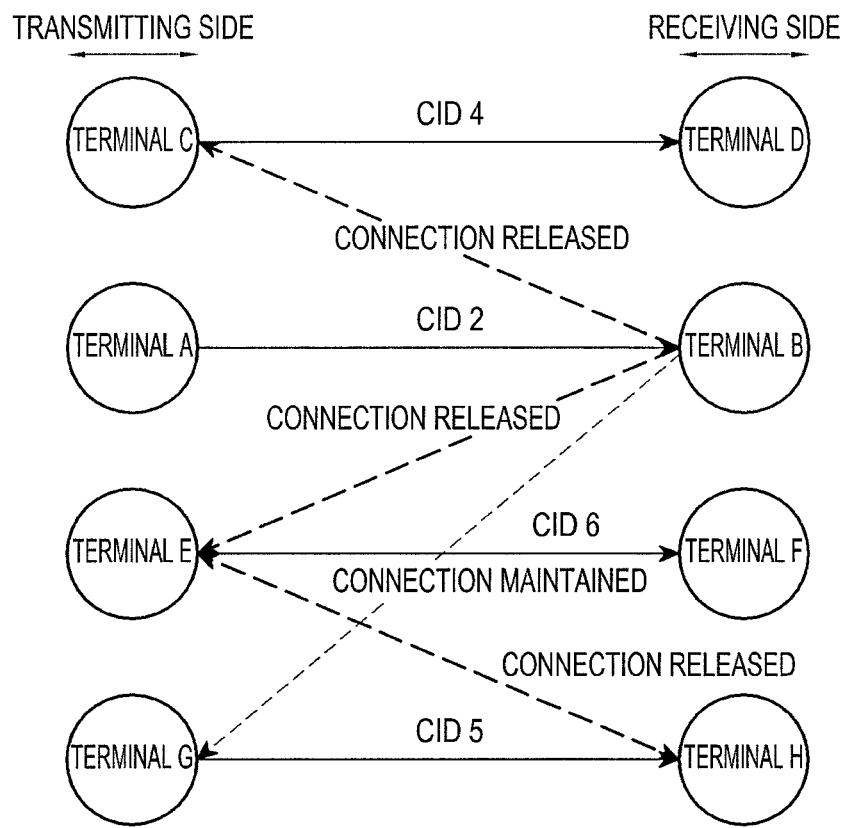
FIG. 4B shows an example of controlling interference between connections set up in an NFC network according to the second exemplary embodiment of the present invention.

FIG. 4B shows an example of controlling interference between connections set up in an NFC network according to the second exemplary embodiment of the present invention.

Referring to FIG. 4B, the terminal H measures received power for interference signals received due to communication in the connection CID6, and compares the measured received power with the threshold of received power. From the comparison, the terminal H determines that received power of interference signals received due to communication in the connection CID6 of the terminal E exceeds the threshold of received power. The terminal H releases setup of the connection CID6 whose received power exceeds the threshold of received power (see 400), determining that the connection CID6 has high interference power.

As described in FIGS. 3C and 4B, receiving terminals, for which connections for direct communication with other terminals are set up in the NFC network, measure received powers of signals received through their own connections, and received powers of interference signals received through their adjacent connections. The receiving terminals calculate their SIRs using the received powers, compare their SIRs with the threshold of SIR, and sequentially release setup of their adjacent connections in an order of the received power from highest to lowest received power until their SIRs exceed the threshold of SIR, thereby controlling interference.

Figure 5:
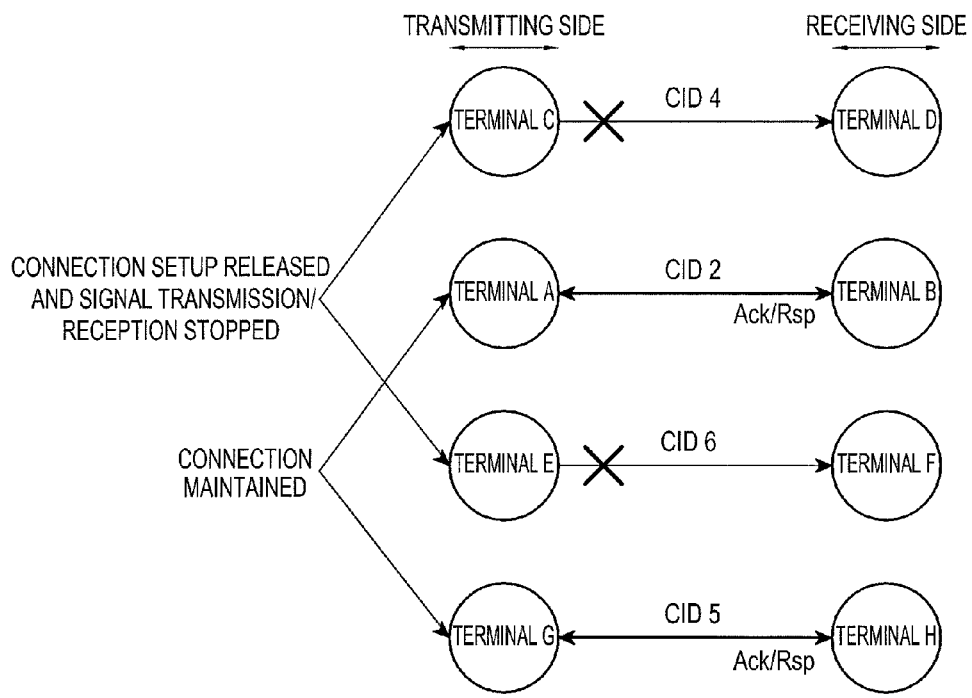
FIG. 5 is a diagram provided for a description of operations of transmitting terminals according to an exemplary embodiment of the present invention.

FIG. 5 is a diagram provided for a description of operations of transmitting terminals according to an exemplary embodiment of the present invention.

Referring to FIG. 5, transmitting terminals C, A, E and G have the same configurations and connections as those in FIGS. 3B, 3C, 4A and 4B.

The terminal C and the terminal E, whose connections are released by operations of the receiving terminal B and the terminal C as in FIGS. 3C and 4B, cannot transmit and receive signals to/from the terminal D and the terminal F, respectively, to which their connections were set up. By operations of the receiving terminal B and the transmitting terminal C, the terminal A and the terminal G may exchange signals with the terminal B and the terminal H, respectively, to which their connections are set up, with interferences controlled.

In an exemplary embodiment of the present invention, connection management information, which indicates that receiving terminals have determined to maintain or release setup for their adjacent connections, is transmitted to transmitting terminals in the following way. Specifically, an exemplary embodiment of the present invention provides a method in which transmitting terminals and receiving terminals, for which connections for direct communication are set up in an NFC network, use the resources used for signal transmission/reception together with the connection management information, and a method in which transmitting terminals and receiving terminals separately use dedicated resources for the connection management information. The connection management information includes ACKnowledgement (ACK) signals indicating maintaining of setup for connections, and Negative ACKnowledgement (NACK) signals indicating release of setup for connections.

In an exemplary embodiment of the present invention, receiving terminals may set different energy levels for the ACK signals and the NACK signals, in transmitting the ACK signals and the NACK signals to transmitting terminals. Specifically, the energy level may be represented in transmit power of the ACK/NACK signals. Referring to FIG. 5, for example, it is assumed that the terminal H has determined to maintain the connection with the terminal G and release the connection with the terminal E. In an exemplary embodiment of the present invention, it is assumed that transmitting terminals all have the same transmit power $P_{ref}$ and receiving terminals also have the same receive gain G. In addition, it is assumed that target powers $P_{target\_ACK}$, and $P_{target\_NACK}$ for the ACK signals and the NACK signals are also predefined.

Since the terminal H has determined to maintain the connection with the terminal G, the terminal H transmits an ACK signal indicating the determination to the terminal G with transmit power determined as follows.

Specifically, the transmit power for an ACK signal is calculated using Equation (4) below.

$$\text{Transmit Power } P_{HG} = P_{PL\_GH} + P_{target\_ACK} - G_G \quad (4)$$

where $P_{target\_ACK}$ and $G_G$ are predefined values as mentioned above, and $P_{PL\_GH}$ denotes a path loss between the terminal G and the terminal H, and is calculated using Equation (5) below, based on a received power value that the terminal H has received from the terminal G.

$$\text{Received Power } P_{GH} = P_{ref\_G} + P_{PL\_GH} - G_H \quad (5)$$

where $P_{ref\_G}$ and $G_H$ are predefined values as mentioned above, and $P_{PL\_GH}$ denotes a path loss between the terminal G and the terminal H, and is obtained using the received power value that the terminal H has received from the terminal G.

Next, since the terminal H has determined to release the connection with the terminal E, the terminal H transmits a NACK message indicating the determination to the terminal E with transmit power determined as follows.

Specifically, the transmit power for a NACK signal is calculated using Equation (6) below.

$$\text{Transmit Power } P_{HE} = P_{PL\_EH} + P_{target\_NACK} - G_E \quad (6)$$

where $P_{target\_ACK}$ and $G_{GE}$ are predefined values as mentioned above, and $P_{PL\_EH}$ denotes a path loss between the terminal E and the terminal H, and is calculated using Equation (7) below, based on a received power value that the terminal H has received from the terminal E.

$$\text{Received Power } P_{EH} = P_{ref\_E} + P_{PL\_EH} - G_H \quad (7)$$

where $P_{ref\_G}$ and $G_H$ are predefined values as mentioned above, and $P_{PL\_EH}$ denotes a path loss between the terminal E and the terminal H, and is obtained using the received power value that the terminal H has received from the terminal E.

Figure 6:
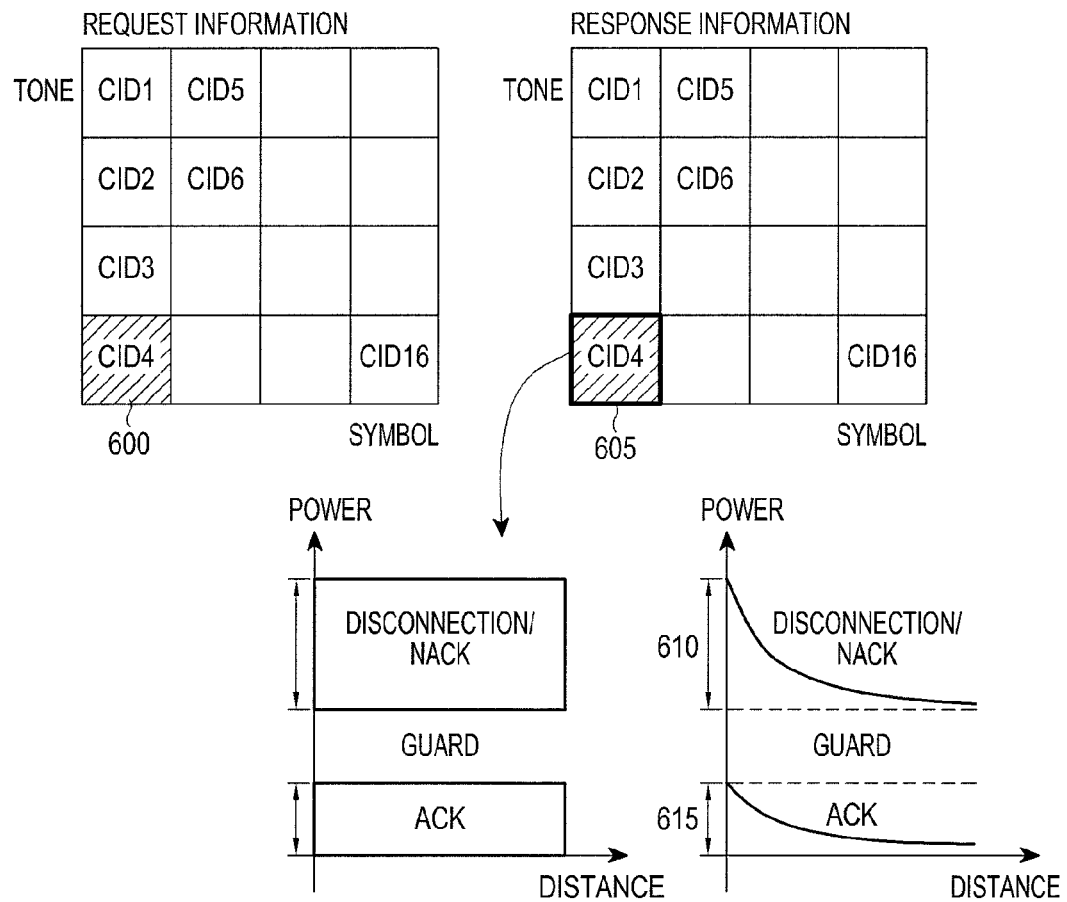
FIG. 6 shows an example of resources allocated to connection management information according to an exemplary embodiment of the present invention.

FIG. 6 shows an example of resources allocated to connection management information according to an exemplary embodiment of the present invention.

For convenience of description, a fourth connection, one of the connections existing in an NFC network and provided for direct communication, will be described. However, it will be apparent to those of ordinary skill in the art that the other connections may also be applied in a similar way. The fourth connection is assumed to be a connection set up for direct communication between a transmitting terminal A and a receiving terminal B.

Referring to FIG. 6, when transmitting a signal to the receiving terminal B through the fourth connection, the transmitting terminal A uses a tone 600 to which a CID4 is allocated, among the resources allocated for direct communication between the transmitting terminal A and the receiving terminal B.

Similarly, the receiving terminal B uses the tone 605 when transmitting a response to the signal. If the receiving terminal B receives interference signals caused by adjacent connections other than the fourth connection, the receiving terminal B measures received powers for the signal received through the fourth connection and the interference signals received due to communication in the adjacent connections, as described above. The receiving terminal B calculates its SIR using the measured received powers, and then compares it with a threshold of SIR. Thereafter, the receiving terminal B determines to release setup for an arbitrary adjacent connection, if the calculated SIR is greater than or equal to the threshold of SIR. In this case, using the tone 605, the receiving terminal B transmits connection management information including a NACK signal indicating the release of the connection, to a transmitting terminal C having the connection determined to be released. Using the tone 605, the receiving terminal B may transmit an ACK indicating maintaining of the connection to the transmitting terminal C.

An exemplary embodiment of the present invention sets different energy level ranges to make it possible to distinguish between NACK signals and ACK signals, when using the resources used for signal transmission/reception between transmitting terminals and receiving terminals, between which connections for direct communication are set up, as resources of the connection management information. As for energy levels of the NACK signals and the ACK signals, when a receiving terminal transmits the ACK/NACK signals to a transmitting terminal, the energy levels may be reduced depending on the distance between the receiving terminal and the transmitting terminal. Due to this phenomenon, the present exemplary embodiment sets energy level ranges of the NACK signals and ACK signals, including an error range based on the distance.

It is assumed that the transmitting terminals and the receiving terminals, between which connections for direct communication are set up, recognize in advance the energy level ranges of the NACK signals and the ACK signals. For example, a transmitting terminal that has received the NACK signal and the ACK signal may set a threshold of one energy level in an order to distinguish between the two signals. In this case, upon receiving a response signal from corresponding transmitting terminals, receiving terminals may determine whether setup for their connections is maintained or released, by comparing an energy level of the received response signal with the threshold. Specifically, if the response signal is higher in energy level than the threshold, a receiving terminal recognizes that the response signal indicates that setup for the connection is released. Similarly, if the response signal is lower in energy level than the threshold, the receiving terminal recognizes that the response signal indicates that setup for the connection is maintained. In this case, the threshold is determined such that energy levels corresponding to the NACK signals and the ACK signals may not overlap.

As another example, two thresholds for energy levels may be set so that transmitting terminals that have received the NACK signal and the ACK signal, may accurately distinguish between the two signals. An energy level #1 610 and an energy level #2 615 may be set to have a sufficient guard. In this case, upon receiving a response signal from corresponding transmitting terminals, receiving terminals may determine whether setup for their connections is maintained or released, by determining whether an energy level of the received response signal corresponds to the energy level #1 610 or the energy level #2 615, both of which are recognized in advance by the receiving terminals.

Figure 7:
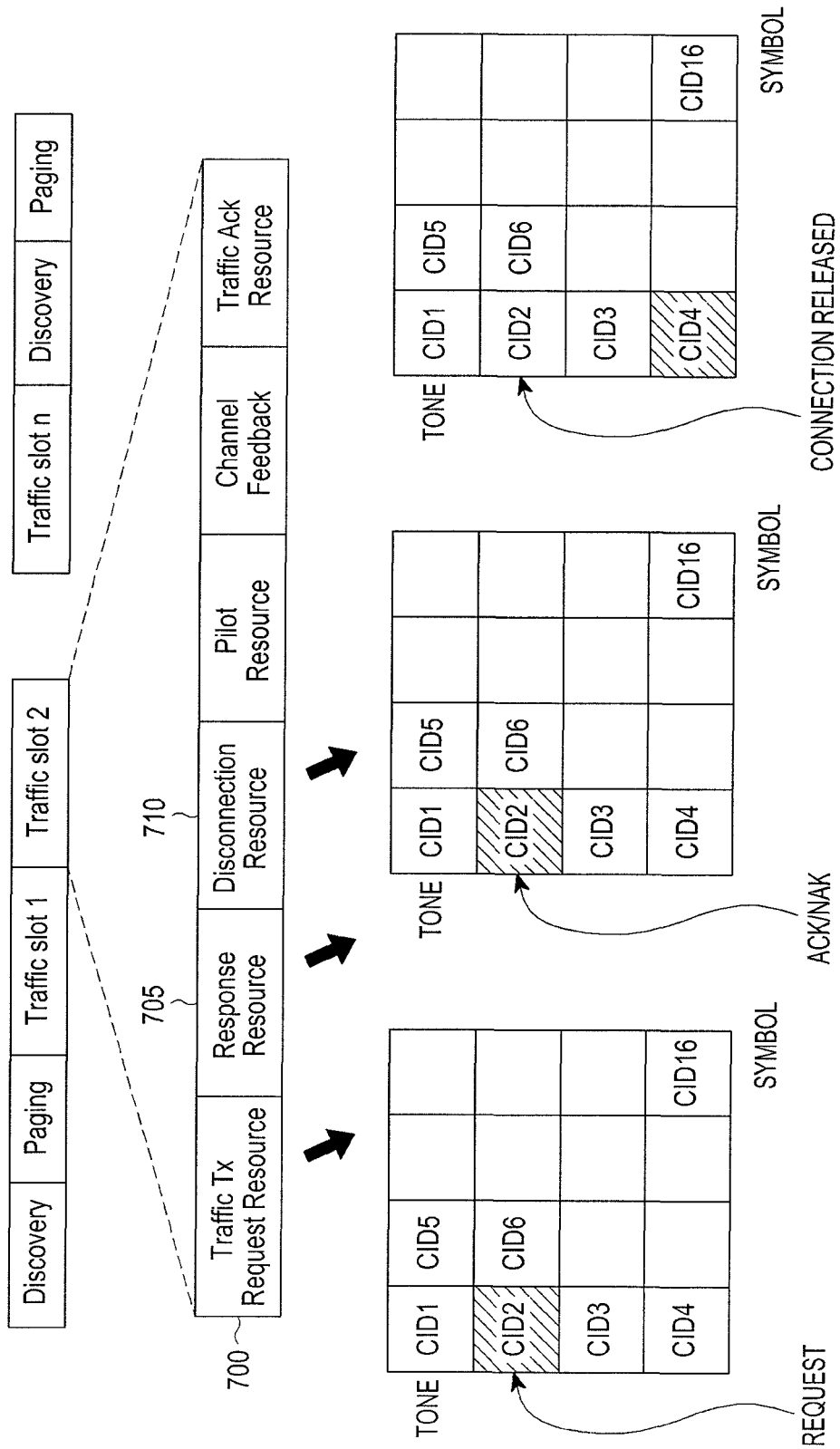
FIG. 7 shows another example of resources allocated to connection management information according to an exemplary embodiment of the present invention.

FIG. 7 shows another example of resources allocated to connection management information according to an exemplary embodiment of the present invention. Like in FIG. 6, for convenience of description, a fourth connection, one of the connections existing in an NFC network and provided for direct communication, will be described. However, it will be apparent to those of ordinary skill in the art that the other connections may also be applied in a similar way. The fourth connection is assumed to be a connection set up for direct communication between a transmitting terminal A and a receiving terminal B.

Referring to FIG. 7, a resource traffic slot #2 allocated for signals transmitted/received during direct communication between the transmitting terminal A and the receiving terminal B, is divided into at least three different areas depending on the usage of the signal that the transmitting terminal A transmits to the receiving terminal B. In other words, traffic transmission request resources, which are used when the transmitting terminal A transmits signals to the receiving terminal B, may be allocated to a first area 700. Response resources, which are used when the receiving terminal B transmits a response signal to the signals received from the transmitting terminal A, may be allocated to a second area 705. Disconnection resources, which are used when the receiving terminal B transmits a NACK signal to the transmitting terminal A having a connection, setup for which is determined to be released, among its adjacent connections, may be allocated to a third area 710.

If resources located in different areas are allocated depending on usage of the signals that transmitting terminals and receiving terminals transmit in direct communication as shown in FIG. 7, there may not be a need for settings for distinguishing the signals as in FIG. 6.

Figure 8:
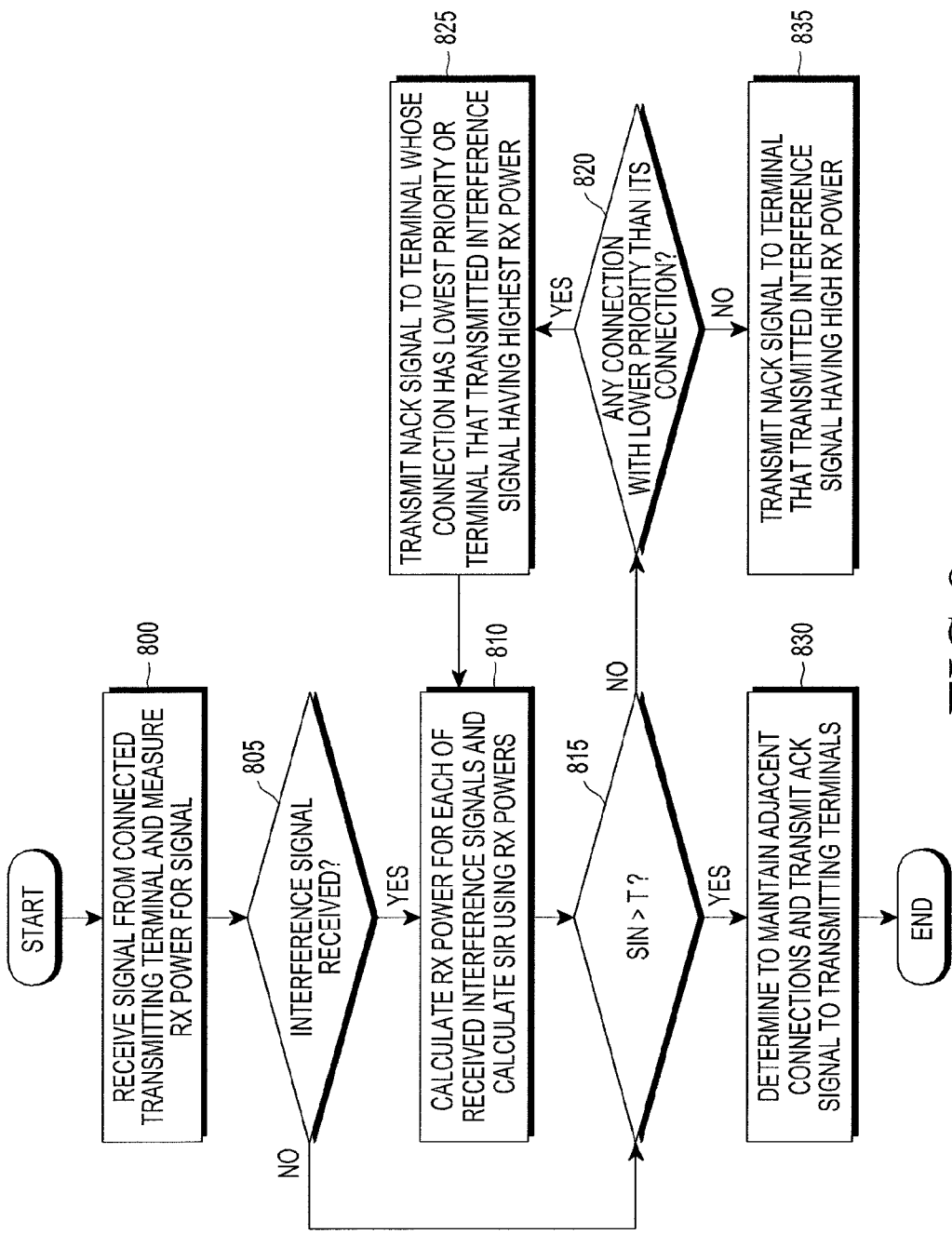
FIG. 8 shows an operation of a receiving terminal according to an exemplary embodiment of the present invention.

FIG. 8 shows an operation of a receiving terminal according to an exemplary embodiment of the present invention. The term 'receiving terminal' as used herein may refer to a terminal serving as a receiving side among the terminals whose connection is set up for direct communication with other terminals.

Referring to FIG. 8, in step 800, the receiving terminal receives a signal from a transmitting terminal to which its connection is set up, through the connection, and measures received power for the received signal.

In step 805, the receiving terminal determines in step 805 whether it has received interference signals caused by communication of its adjacent connections. The receiving terminal proceeds to step 810 upon receiving interference signals, and proceeds to step 815 upon failure to receive interference signals.

In step 810, the receiving terminal measures received powers for the received interference signals, and calculates an SIR using the measured received powers.

In step 815, the receiving terminal determines whether its SIR exceeds a predetermined threshold T of the SIR. If its SIR exceeds the threshold T of the SIR, the receiving terminal determines to maintain setup for the connection and transmits an ACK signal indicating the maintaining of the connection to the transmitting terminal, in step 830.

If its SIR is less than or equal to the threshold T of the SIR, the receiving terminal determines in step 820 whether an adjacent connection having a lower priority than its connection exists among the adjacent connections. If there is no adjacent connection having a lower priority than its connection, the receiving terminal transmits a NACK signal indicating release of setup for the connection to the transmitting terminal in step 835.

If there is an adjacent connection having a lower priority than its connection, the receiving terminal determines in step 825 to release setup for the connection of the transmitting terminal that transmitted the interference signal having the highest value (or maximum received power) among the received powers calculated in step 810, or to release setup for the connection having the lowest priority among the adjacent connections, and then returns to step 810. As for the priorities and the received power strengths which are considered to determine whether to release setup for the adjacent connections, only one of the two parameters may be considered, or a sum (i.e., sum=a*priority+b*power strength, where 'a' and 'b' are proportional coefficients) of the priorities and the power strengths may be considered, in which both of the two parameters are considered.

After returning to step 810, the receiving terminal calculates again its SIR using the remaining received powers excluding the received power of the connection, setup for which was determined to be released in step 825, and then proceeds to step 815.

Figure 9:
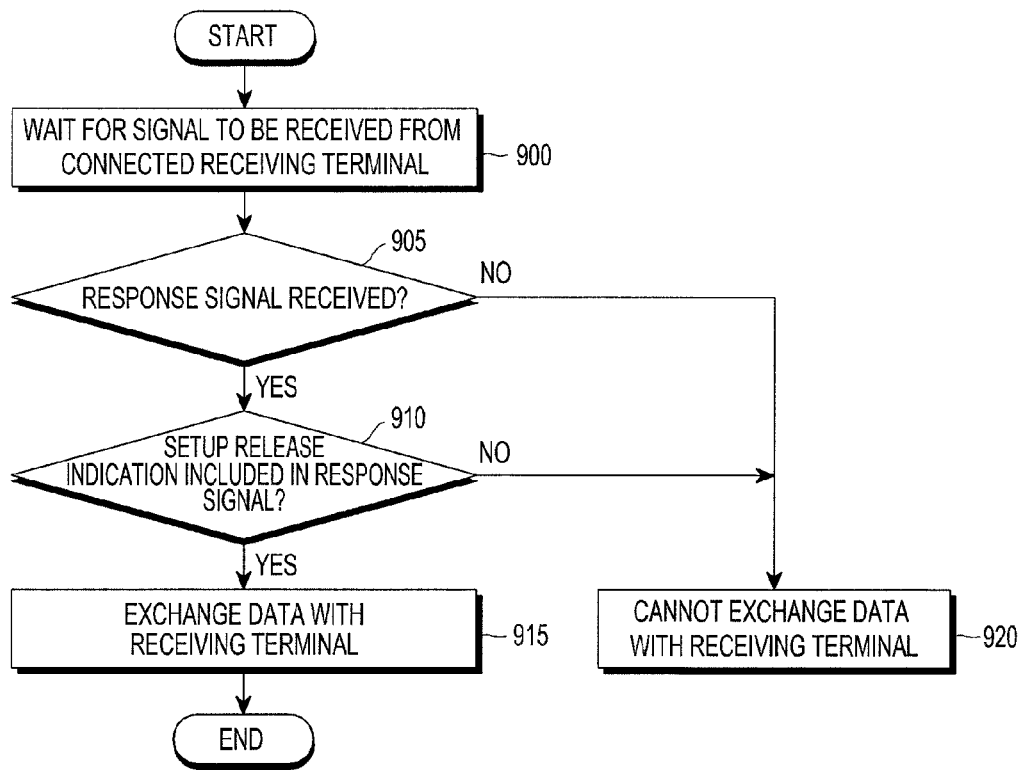
FIG. 9 shows an operation of a transmitting terminal according to an exemplary embodiment of the present invention.

FIG. 9 shows an operation of a transmitting terminal according to an exemplary embodiment of the present invention.

Referring to FIG. 9, in step 900, the transmitting terminal transmits a signal to a receiving terminal, to which its connection is set up, and waits for reception of a response signal to the transmitted signal.

The transmitting terminal determines in step 905 whether a response signal to the transmitted signal is received from the receiving terminal. The transmitting terminal proceeds to step 920 upon failure to receive the response signal, and proceeds to step 910 upon receiving the response signal.

In step 910, the transmitting terminal determines whether the response signal includes a setup release indication for its connection. Whether the response signal includes a setup release indication is recognized by determining whether an energy level of the response signal falls within an energy level range of a NACK signal, which the transmitting terminal recognizes in advance.

If the setup release indication is not included, the transmitting terminal recognizes in step 915 that signal exchange with the receiving terminal is possible. However, if the setup release indication for the connection is included, the transmitting terminal recognizes in step 920 that signal exchange with the receiving terminal is not possible.

Figure 10:
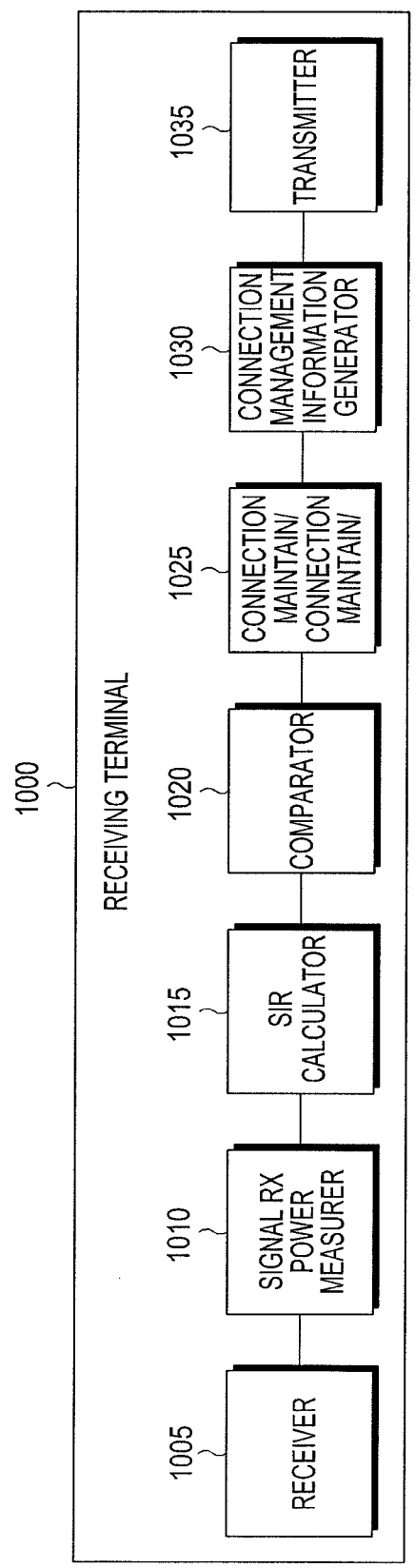
FIG. 10 shows a schematic structure of a receiving terminal according to an exemplary embodiment of the present invention.

FIG. 10 shows a schematic structure of a receiving terminal according to an exemplary embodiment of the present invention.

Referring to FIG. 10, a receiving terminal 1000 includes a receiver 1005, a signal receive (Rx) power measurer 1010, an SIR calculator 1015, a comparator 1020, a connection maintain/release determiner 1025, a connection management information generator 1030, and a transmitter 1035.

The receiver 1005 receives a signal through a connection set up in advance for direct communication with the receiving terminal 1000, receives interference signals caused by communication of its adjacent connections, and transfers the received interference signals to the signal Rx power measurer 1010.

The signal Rx power measurer 1010 measures received powers for the received signal and interference signals, and transfers the measured received powers to the SIR calculator 1015. The SIR calculator 1015 calculates an SIR defined by Equation (1) using the measured received powers, and transfers the calculated SIR to the comparator 1020.

The comparator 1020 compares the input SIR with a threshold T of the SIR, which is stored in advance, and transfers the comparison results to the connection maintain/release determiner 1025.

The connection maintain/release determiner 1025 determines to maintain setup for the connection of the receiving terminal 1000 if the input SIR is greater than or equal to the threshold of SIR. If the input SIR is less than the threshold of SIR, the connection maintain/release determiner 1025 determines whether an adjacent connection having a lower priority than the connection (or its own connection) of the receiving terminal 1000 exists among the adjacent connections from which interference signals are received, and determines to release setup for the connection, if there is no adjacent connection having a lower priority than its connection. In addition, if there is an adjacent connection having a lower priority than its connection, the connection maintain/release determiner 1025 determines to release setup for the connection of the transmitting terminal that has transmitted an interference signal having the highest value (or maximum received power) among the received powers measured by the signal Rx power measurer 1010, or determines to release setup for the connection having the lowest priority among the adjacent connections. As for the priorities and the received power strengths which are considered to determine to release setup for the adjacent connections, only one of the two parameters may be considered, or a sum (i.e., sum=a*priority+b*power strength, where 'a' and 'b' are proportional coefficients) of the priorities and the power strengths may be considered, in which both of the two parameters are considered. The connection maintain/release determiner 1025 transfers the results on the determination to maintain or release setup for the connection, to the connection management information generator 1030.

The connection management information generator 1030 generates connection management information depending on the determination results, and transfers the connection management information to the transmitter 1035. In other words, the connection management information generator 1030 generates an ACK signal if the termination results indicate maintaining of setup for the connection, and generates a NACK signal if the termination results indicate release of setup for the connection.

The transmitter 1035 transmits the input ACK signal or NACK signal to transmitting terminals.

Figure 11:
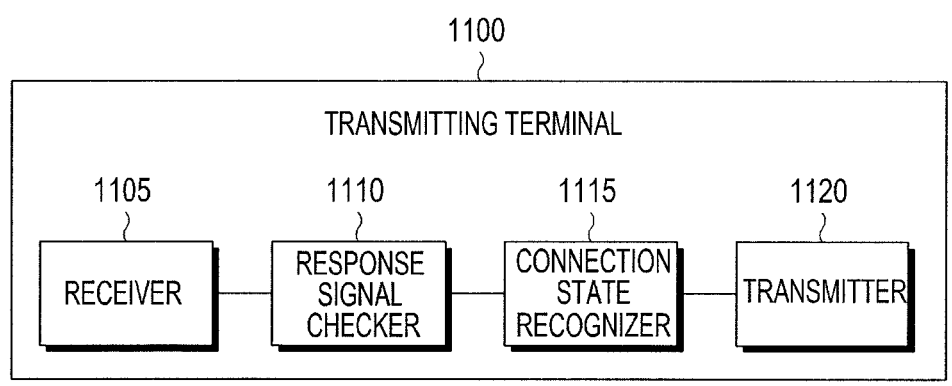
FIG. 11 shows a schematic structure of a transmitting terminal according to an exemplary embodiment of the present invention.

FIG. 11 shows a schematic structure of a transmitting terminal according to an exemplary embodiment of the present invention.

Referring to FIG. 11, a transmitting terminal 1100 includes a receiver 1105, a response signal checker 1110, a connection state recognizer 1115, and a transmitter 1120.

The transmitter 1120 transmits a signal to a receiving terminal to which its connection is set up. Thereafter, the receiver 1105 receives a response signal to the transmitted signal, from the receiving terminal, and transfers the response signal to the response signal checker 1110.

The response signal checker 1110 checks whether the response signal includes setup release indication for its connection. The response signal checker 1110 may determine whether the response signal includes the setup release indication by checking whether an energy level of the response signal falls within an energy level range of a NACK signal, which is recognized in advance, and transfers the determination results to the connection state recognizer 1115.

The connection state recognizer 1115 recognizes that signal exchange with the receiving terminal is possible through the connection, if the response signal does not include the setup release indication. The connection state recognizer 1115 recognizes that signal exchange with the receiving terminal is impossible through the connection, if the response signal includes the setup release indication for the connection.

As is apparent from the foregoing description, in a case where a plurality of connections exist in an NFC network, for each of a plurality of terminals that may simultaneously attempt direct communication with another terminal, exemplary embodiments of the present invention may release adjacent connections to an arbitrary connection in an order of the priority from low to high priority, or in an order of received power from high to low received power, thereby making it possible to reduce interference to the connection. In addition, only the receiving side may determine to release and maintain setup for adjacent connections, simplifying the interference control procedure.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling interference in a Near Field Communication (NFC) network including a plurality of connections for direct communication between terminals, the method comprising:
   receiving a signal transmitted by a first terminal through a first connection for direct communication with the first terminal, and measuring received power for the signal;
   measuring received power for each of interference signals upon receiving the interference signals caused by communication through connections other than the first connection among the plurality of connections;
   calculating a first Signal-to-Interference Ratio (SIR) using the received power for the signal and the received power for each of interference signals; and
   determining to one of maintain and release setup for each of the connections other than the first connection, if the first SIR is less than a threshold.

2. The method of claim 1, wherein the determining to one of maintain and release setup for each of the connections other than the first connection comprises:
   determining whether at least one connection having a lower priority than the first connection exists among the connections other than the first connection; and
   if at least one connection having a lower priority than the first connection exists, determining to release setup for a connection having the lowest priority among the at least one connection, or determining to release setup for a connection through which an interference signal having received power with a highest value among received powers for the interference signals is received.

3. The method of claim 2, further comprising:
   calculating a second SIR using received power for each of remaining connections excluding a connection, whose setup is determined to be released, among the connections other than the first connection, and received power for the first connection; and
   determining to one of maintain and release setup for each of the remaining connections if the second SIR is less than the threshold.

4. The method of claim 1, further comprising transmitting connection management information to a terminal for which a connection is set up, the connection management information indicating results obtained by determining to maintain and release setup for each of the connections other than the first connection,
   wherein the connection management information includes at least one of an ACKnowledgement (ACK) signal indicating maintaining of setup for connections other than the first connection, and a Negative ACKnowledgement (NACK) signal indicating release of the setup.

5. The method of claim 4, further comprising transmitting the connection management information using one of shared resources and dedicated resources,
   wherein the shared resources indicate resources used for signal transmission/reception by receiving terminals and transmitting terminals between which the plurality of connections are set up, and the dedicated resources indicate resources which are allocated to transmit the connection management information and are distinguishable from the shared resources.

6. The method of claim 5, wherein, if the connection management information is transmitted using the shared resources, energy levels for the ACK signal and the NACK signal have different ranges on the basis of a threshold that is set by taking into account an error range depending on a distance between terminals to and at which the ACK signal and the NACK signal are transmitted and received.

7. The method of claim 1, wherein transmit power for transmitting the connection management information to a terminal, for which a connection is set up, is predefined for each of the ACK signal and the NACK signal and determined using at least one of target transmit power, a gain of the first terminal, and a path loss with the first terminal, and the path loss with the first terminal is determined using at least one of power applied in common to transmitting terminals, the received power, and the gain of the first terminal.

8. A method for controlling interference in a Near Field Communication (NFC) network having a plurality of connections for direct communication between terminals, the method comprising:
   transmitting a signal through a first connection for direct communication with a first terminal, and waiting for a response signal to the transmitted signal;
   upon receiving the response signal, determining whether the response signal includes a setup release indication for the first connection; and
   recognizing that signal exchange with the first terminal is possible, if the response signal includes no setup release indication for the first connection.

9. The method of claim 8, wherein the determining of whether the response signal includes a setup release indication for the first connection comprises checking whether one of an energy level and a transmit power of the response signal is greater than or equal to a reference value or target transmit power of a pre-recognized energy level.

10. An apparatus for controlling interference in a Near Field Communication (NFC) network including a plurality of connections for direct communication between terminals, the apparatus comprising:
   a receiver receiving a signal transmitted by a first terminal through a first connection for direct communication with the first terminal, and receiving interference signals caused by communication through connections other than the first connection among the plurality of connections;
   a received power measurer measuring received power for the signal transmitted by the first terminal and each of the interference signals;
   a Signal-to-Interference Ratio (SIR) calculator calculating a first SIR using the received power for the signal and the received power for each of the interference signals;
   a comparator comparing the first SIR with a threshold; and
   a connection maintain/release determiner determining to one of maintain and release setup for each of connections other than the first connection, if the first SIR is less than the threshold.

11. The apparatus of claim 10, wherein the connection maintain/release determiner determines whether at least one adjacent connection having a lower priority than the first connection exists among the connections other than the first connection, and, if at least one connection having a lower priority than the first connection exists, determines to release setup for a connection having the lowest priority among the at least one connection, or determines to release setup for a connection through which an interference signal having received power with a highest value among received powers for the interference signals is received.

12. The apparatus of claim 11, wherein the SIR calculator calculates a second SIR using received power for each of remaining connections excluding a connection, whose setup is determined to be released, among the connections other than the first connection, and received power for the first connection, wherein the connection maintain/release determiner determines to one of maintain and release setup for each of the remaining connections if the second SIR is less than the threshold.

13. The apparatus of claim 11, wherein the connection maintain/release determiner determines to release setup for the first connection, if there is no connection having a lower priority than the first connection.

14. The apparatus of claim 10, further comprising a transmitter transmitting connection management information to a terminal for which a connection is set up, the connection management information indicating results obtained by determining to one of maintain and release setup for each of the adjacent connections other than the first connection, wherein the connection management information includes at least one of an ACKnowledgement (ACK) signal indicating maintaining of setup for connections other than the first connection, and a Negative ACKnowledgement (NACK) signal indicating release of the setup.

15. The apparatus of claim 14, wherein the transmitter transmits the connection management information using one of shared resources and dedicated resources, and wherein the shared resources indicate resources used for signal transmission/reception by receiving terminals and transmitting terminals between which the plurality of connections are set up, and the dedicated resources indicate resources which are allocated to transmit the connection management information and are distinguishable from the shared resources.

16. The apparatus of claim 15, wherein, if the connection management information is transmitted using the shared resources, energy levels for the ACK signal and the NACK signal have different ranges on the basis of a threshold that is set by taking into account an error range depending on a distance between terminals to and at which the ACK signal and the NACK signal are transmitted and received.

17. The apparatus of claim 14, wherein transmit power for transmitting the connection management information to a terminal, for which a connection is set up, is predefined for each of the ACK signal and the NACK signal and determined using at least one of target transmit power, a gain of the first terminal, and a path loss with the first terminal, and wherein the path loss with the first terminal is determined using at least one of power applied in common to transmitting terminals, the received power, and the gain of the first terminal.

18. An apparatus for controlling interference in a Near Field Communication (NFC) network having a plurality of connections for direct communication between terminals, the apparatus comprising:

a transmitter transmitting a signal through a first connection for direct communication with a first terminal;

a receiver receiving a response signal to the transmitted signal;

a response signal checker, upon receiving the response signal, determining whether the response signal includes a setup release indication for the first connection; and a connection state recognizer recognizing that signal exchange with the first terminal is possible, if the response signal includes no setup release indication for the first connection.

19. The apparatus of claim 18, wherein the response signal checker checks whether one of an energy level and a transmit power of the response signal is greater than or equal to a reference value or target transmit power of a pre-recognized energy level.

* * * * *